United States Patent [19]

Tucker et al.

[11] 3,929,746

[45] Dec. 30, 1975

[54] SULPHUR VULCANIZABLE ELASTOMERIC COPOLYMERS

[75] Inventors: Harold Tucker, Akron; Robert J. Minchak, Parma Heights, both of Ohio

[73] Assignee: The B. F. Goodrich Company, Akron, Ohio

[22] Filed: Dec. 12, 1962

[21] Appl. No.: 243,987

[52] U.S. Cl..... 260/80.78; 260/79.5 B; 260/79.5 C; 260/88.2 E
[51] Int. Cl.[2] C08F 210/00; C08F 212/00; C08F 28/00
[58] Field of Search............ 260/80.5, 80.5 H, 79.5, 260/79.5 B, 88.2, 80.78, 88.2 E

[56] References Cited
UNITED STATES PATENTS

| | | | |
|---|---|---|---|
| 2,933,480 | 4/1960 | Gresham et al. | 260/80.78 |
| 3,000,866 | 9/1961 | Tarney | 260/80.78 |
| 3,063,973 | 11/1962 | Gladding et al. | 260/80.78 |
| 3,091,601 | 5/1963 | Reding et al. | 260/80.78 |
| 3,093,620 | 6/1963 | Gladding et al. | 260/80.78 |
| 3,211,709 | 10/1965 | Adamek et al. | 260/80.78 |
| 3,222,333 | 12/1965 | Duck et al. | 260/80.78 |
| 3,260,708 | 7/1966 | Natta et al. | 260/80.78 |
| 3,301,833 | 1/1967 | Natta et al. | 260/80.78 |
| 3,310,537 | 3/1967 | Natta et al. | 260/80.78 |
| 3,453,250 | 1/1969 | Natta | 260/80.78 |
| 3,476,720 | 11/1969 | Natta | 260/80.78 |
| 3,502,302 | 4/1970 | Natta | 260/80.78 |

Primary Examiner—Joseph L. Schofer
Assistant Examiner—Herbert J. Lilling
Attorney, Agent, or Firm—J. Hughes Powell, Jr.

[57] ABSTRACT

Vulcanizable, high molecular weight, normally solid copolymers of ethylene and an unfused, non-conjugated, cyclic diene having no more than about thirty carbon atoms, said copolymers prepared by contacting a mixture of the monomers with a catalyst consisting of an organometallic compound of aluminum and a hydrocarbon-soluble vanadium compound.

2 Claims, No Drawings

SULPHUR VULCANIZABLE ELASTOMERIC COPOLYMERS

This invention relates to the manufacture of sulphur vulcanizable elastomeric interpolymers. More particularly, however, this invention is concerned with interpolymers produced from various olefin compounds in combination with certain polyolefin compounds, the latter compounds being of a type which confer sulfur cure capabilities on such interpolymers.

In addition to being formed from monomers which are widely available in commercial quantities and at attractive prices, ethylene-propylene type copolymers contain little if any residual unsaturation and consequently do not suffer from the attack of ozone and oxygen, agents by which ordinary elastomers are detrimentally affected. Besides being relatively inexpensive and inert, ethylene-propylene elastomeric compounds can have, depending on the ratio of the component monomers, extremely good low temperature and other physical properties. For the foregoing and additional reasons, therefore, ethylene-propylene type elastomers are materials of considerable commercial worth which it is desirable to employ in various applications now using other more expensive materials.

In order for elastomers to realize widespread use, however, it is necessary that they be capable of undergoing a crosslinking "cure" or vulcanization type reaction. Cured elastomers possess superior physical characteristics; they have, for example, better abrasion resistance, are considerably stronger than uncured materials, are more elastic, and in addition, the cured compounds have a greatly reduced tendency to soften when exposed to elevated temperatures.

Heretofore, one of the principal disadvantages of the ethylenepropylene type polymers has been the difficulty encountered in trying to obtain efficient cures, compatible with present industrial practices, which result in acceptable commercial products. One method which has been proposed employs peroxide-type free radical generators to obtain a cure, and although employment of peroxide materials produces a cured ethylene-propylene elastomer, the use of such a system is undesirable for various reasons. Peroxide cures are, for instance, relatively expensive and in many cases difficult to accomplish. Furthermore, the use of curing techniques which include peroxides, frequently results in an elastomeric product having objectionable residual odors.

Most industrial organizations employing elastomers in fabrication of finished and semi-finished goods, the principal potential users of the ethylene-propylene containing interpolymers contemplated herein, possess a considerable amount of experience and "know-how" with respect to sulphur type cures. In addition, much of the equipment and technology which has been developed in the elastomeric field has been built around the sulfur vulcanization process. It can readily be appreciated, therefore, that an ethylene-propylene type elastomer which lends itself to curing with standard sulfur techniques is much to be preferred over other systems presently known.

Now a method has been found for producing ethylene-propylene containing interpolymers which can readily be cured by conventional sulfur processes. The ethylene-propylene compositions capable of such curing methods are made possible by chemical incorporation within such compositions of various polyolefins, many of which are readily available at commercially advantageous prices. The ethylene-propylene containing interpolymers discovered can be cured with conventional sulfur type vulcanization procedures, and no unusual or specialized equipment is required. Furthermore, the resulting products have improved physical characteristics, and are noticeably less subject to degradative effects produced from contact with various oxygen containing substances. Although when vulcanized conventionally with sulfur or sulfur containing compounds, the ethylene-propylene containing elastomers of the invention possess increased abrasion resistance, such elastomers do not have the objectionable residual odors often encountered with the peroxide type cures.

In accordance with this invention, sulfur vulcanizable elastomeric interpolymers can be produced by combining at least one, preferably two, monoolefins with polyunsaturated compounds of a type possessing no conjugated unsaturation. Polyunsaturated compounds of the type specified herein are distinguished in that they necessarily include an unsaturated cyclic structure — in addition to any fused, cyclic structure or cyclic structure containing a bridged carbon atom which may be present. Such polyunsaturated compounds are further characterized in that, except in the case of such of the compounds as contain at least two double bonds located in cyclic structures, a minimum of one of any unsaturated chain, cyclic structure substituent present contains a terminal double bond which has a beta hydrogen atom attached to it.

The sulfur vulcanizable interpolymers of the type with which the invention is concerned consist of ethylene and propylene, in the preferred embodiment, polymerized with certain polyolefin compounds instrumental in producing the desired sulfur vulcanizations. Effectual polyolefins have been found to be those, which although polyunsaturated, contain no conjugated double bond within their configuration. While the polyolefin compounds may or may not contain fused cyclic structures, cyclic structures containing a bridged carbon atom, and combinations of them, it is necessary that over and above any such structure or structures which may be present, the polyolefin include an additional unsaturated cyclic structure. It has further been found that in order to assure reactive points of unsaturation in the polyolefins, the compounds should either possess multiple points of unsaturation located in cyclic portions of such compounds or the polyolefins must, in addition to having one double bond in a cyclic structure, have at least one additional double bond present in the terminal position of a chain forming part of the polyolefin. Further, operable terminal double bonds are of the class which have an attached beta hydrogen atom. The term "beta hydrogen atom" as used herein is construed to mean a hydrogen atom attached to the penultimate carbon atom in the chain. Interpolymers of the foregoing type, when combined with vulcanizing agents, such as sulfur or sulfur containing compounds, advantageously, in association with certain auxiliary substances, can readily be vulcanized to form elastomeric compositions displaying the necessary physical properties to permit their use in a wide variety of products such as, for instance, tires, mechanical goods and similar applications.

Although various olefins and mixtures of olefins may be used in preparing the interpolymers, alpha olefins have been found to be especially useful in the preparation of the sulfur vulcanizable elastomeric compositions of the invention. Among such alpha olefins, those containing from two to eight carbon atoms including ethylene, propylene, butylene and mixtures of any of them enable a polymer having the requisite properties to be easily prepared. Interpolymers comprised of both ethylene and propylene have been found to be preferred, however, not only because of the remarkable properties exhibited by interpolymers containing such components, but in addition, because of the efficiency with which such materials can be vulcanized.

The polyunsaturated compounds required to obtain the sulfur vulcanization properties of the interpolymers are distinguished by certain characteristics among which may be mentioned the following. It is necessary that the compounds be ones which contain at least two double bonds. In the compounds disclosed, the bonds appear to possess different degrees of reactivity; that is to say, in the polymerization, one of the double bonds — seemingly the most reactive — combines with the other monomers present to provide the polymeric structure. At least one double bond, however, appears to be unaffected during the polymerization, although it retains a latent reactive character and provides means for carrying out a subsequent vulcanization. The points of unsaturation must be of a non-conjugated character, apparently, in order to obtain the differential reactivity characteristics required; thus aromatic and other types of conjugated unsaturation are insufficient to produce the sulfur vulcanizing capabilities desired.

A further quality found necessary in operable polyolefins is the possession by such polyolefins of an unsaturated cyclic structure. The compound may, of course, contain additional cyclic structures, which may or may not be unsaturated, including fused cyclic structures, i.e., multiple rings joined by having two common atoms and cyclic structures which contain a bridged carbon atom, that is, those containing an atom linked by valences so as to form a connection, or bridge, linking two of the atoms within the ring. Operative polyolefins of the invention are characterized, however, by requiring the presence of an unsaturated cyclic structure in addition to any fused, bridged, or combination fused-bridged cyclic structure which, although not required, may be present. The existencee of such an unsaturated cyclic structure, besides existence necessary to produce an interpolymer which can readily be vulcanized with sulfur containing agents to yield a polymeric product possessing highly improved physical properties, facilitates analysis and control of the polymerization, and for these and other reasons its presence is necessary.

As previously stated, multiple points of unsaturation are required to produce the sulfur vulcanization characteristics desired. The unsaturation can be present in one or more ring structures, preferably carbocyclic in nature, making up the polyolefin, or it may be present partially in a ring structure and partially in a chain contained by the polyolefin. Where only one of the double bonds is located in a ring structure and the necessary additional unsaturation occurs in a chain attached directly or indirectly to the unsaturated cyclic structure, it has been determined that satisfactory sulfur vulcanization qualities can be imparted to the interpolymer by the polyolefins only if at least one of such chain substituents, having a minimum of two carbon atoms, contains a double bond located in a terminal position in the chain. It is also preferred that such terminal double bond possess an attached beta hydrogen atom.

Particularly satisfactory polyolefin monomers for the purposes of the invention have been found to be those containing about thirty or fewer carbon atoms and except in those cases in which at least two double bonds are located in cyclic structures, a diolefin which contains a minimum of nine carbon atoms is of particular advantage in producing materials which can readily be vulcanized.

The compounds most suited to preparation of sulfur vulcanizable interpolymers are diolefins, and while the list is not to be considered comprehensive, among those diolefin compounds which have been found to be capable of conferring sulfur vulcanization capabilities are:

5-(3' - cyclohexenyl) - 2-norbornene

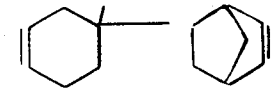

1,2 - dimethyl - 4 - vinyl - 1 - cyclohexene

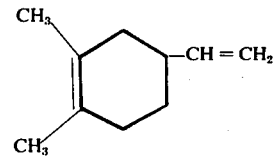

2-methyl-4-vinyl-1-cyclohexene

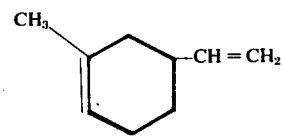

1 - methyl - 4 - vinyl - 1 - cyclohexene

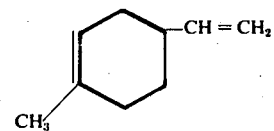

1 - allyl - 1 - cyclohexene

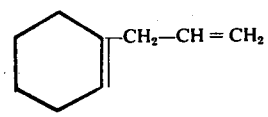

Certain terminally unsaturated alkenyl cyclohexenyl compounds and mixtures of them of the formula

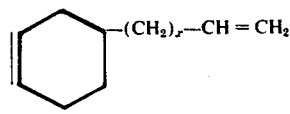

in which x may be 2 - 10 have been found to produce superior results in forming satisfactory interpolymers according to this invention, and their use is preferred. One such compound, for example, is 4- butenyl - 1 -cyclohexene

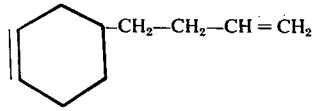

The most preferred compound, and one with which the formation of particularly commercial interpolymers possessing outstanding physical characteristics can be obtained, is 1,5-cyclooctadiene.

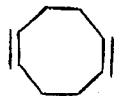

Mixtures of 1,5-cyclooctadiene with other diolefin compounds capable of reacting with ethylene, propylene containing interpolymers are also of particular advantage. If desired, various substituted 1,5-cyclooctadienes may be employed in carrying out the purposes of the invention.

In preparing the interpolymers of the invention, considerable latitude may be exercised in adjusting the relative amounts of polyolefin to olefin units present in the interpolymer; however, the introduction of insufficient polyolefin units produces a material which does not possess enough double bonds to vulcanize properly. When on the other hand, if an attempt is made to incorporate excessive amounts of polyolefin units in the interpolymer, the presence of such large amounts of the polyolefin monomer in the polymerization reaction mixture serves to inhibit the polymerization unless additional catalyst is added — an economically undesirable expedient. Although the quantities may be varied, subject to the above considerations, experience has shown that the presence of at least about 0.3 mole percent, more preferably, one mole percent of polyolefin units, based on the total polyolefin and olefin units present, is to be desired to assure that the interpolymer will be able to achieve commercially acceptable vulcanizations. As much as approximately ten mole percent of polyolefin may, if desired, be incorporated in the product during the course of the polymerization without any necessity for addition of extra catalyst. In the preferred embodiment of the invention, however, interpolymers are prepared in which about 2.5 mole percent of the monomeric units present are derived from the polyolefin component.

While sufficient polyolefin units should be present to produce an interpolymer having satisfactory vulcanization properties, the practitioner may choose any ratio of olefin unit components desired. Thus in the case of interpolymers containing ethylene and propylene in combination with polyolefin units, a product can be formed which contains — except for the polyolefin component — practically all ethylene. On the other hand, if desired an interpolymer can be obtained in which the olefin content consists almost entirely of propylene. A polymeric product wherein the ethylene and propylene units present are in approximately equimole concentration displays particularly valuable properties, and interpolymers having such an olefin distribution are particularly preferred.

Although other catalysts have been found which can successfully be employed to polymerize olefins with the polyolefins described herein, the use of catalysts comprising organometallic compounds, particularly organoaluminum substances, in combination with various heavy metal compounds is to be desired.

Organoaluminum compounds may conveniently consist of trialkylaluminum compounds such as, for example, trimethylaluminum, triethylaluminum, triisobutylaluminum and higher derivatives. Other suitable aluminum materials include, for instance, alkylaluminum halide compounds in which the halide may be chloride, bromide, iodide or fluoride, and the alkyl substituent can comprise methyl, isobutyl, octyl and similar radicals. Among such compounds may be mentioned ethylaluminum dichloride, ethylaluminum dibromide, diethylaluminum chloride, diisobutylaluminum chloride, diethylaluminum bromide, diethylaluminum fluoride and others. Additional components which may be employed are alkoxy, aroxy, or carboxy containing compounds such as diisobutylisobutoxyaluminum, diethylphenoxyaluminum, diisobutylaluminum acetylacetonate and many others. Also operable, are mixtures of dialkylaluminum monohalide and monoalkyl aluminum dihalide compounds, substances commonly referred to as "sesquihalides."

Many different heavy metal compounds can be used including those containing, for example, titanium, vanadium, etc. Of particular value in polymerizing the monomers, however, are salts of vanadium in which the vanadium is present in the +3, 4 or 5 oxidation states including the halides, oxides, salts of organic as well as inorganic acids, and complexes containing vanadium compounds.

Specifically, vanadium compounds such as vanadium trichloride, vanadium tetrachloride, vanadium triiodide, vanadium tetraiodide and various other halovanadium compounds, vanadium oxide, vanadium triacetylacetonate, vanadium oxytrichloride, vanadium hydroxide, vanadium sulfide, vanadium sulphate, vanadate esters of the type $VO(OR)_3$ in which "R" may be methyl, ethyl, isopropyl, butyl and the like, and additional vanadium containing materials are suitable.

The relative amounts of the catalyst components may be varied within broad limits. Usually, however, it is convenient to include a minimum of 1.0 gram millimole of the organometallic compound, such as an alkylaluminum, for every 100 grams of polymer sought. Although, practically speaking, there is no upper limit, the use of from about 13 to 80 gram millimoles of aluminum compound for every 100 grams of polymer is preferred.

With respect to the heavy metal compound at least about 0.1 gram millimole of the any such compound as, for instance, a vanadium compound, is required for each gram millimole of the organometallic component. If desired, the vanadium constituent can be employed in any amount so long as the moles of vanadium is not more than about double the moles of aluminum present; however, in the preferred case, it has been determined that 1 gram millimole of vanadium compound should be used for approximately every 1 to 10 gram millimoles of the aluminum component present.

Although polymerization of the monomers may be carried out in its absence, the presence of an inert polymerization medium advantageously, one having appreciable component solubilizing ability and liquid under the reaction conditions, provides certain advantages in carrying out the polymerization process and its use is desirable. Operative polymerization media comprise various aromatics, i.e., benzene, toluene, xylene, and the like; aliphatics, including butane, 2-butene, pentane, hexane and heptane; as well as similar materials, including various chlorinated hydrocarbons such as tetrachloroethylene, chlorobenzene and the like. Mixtures of any of the preceding or other similar hydrocarbons can also successfully be employed. Although greater quantities may be used, the employment of a minimum of about 500 cc. of polymerization medium for each 100 grams of polymer to be prepared produces a superior system. In the preferred embodiment of the invention, however, at least about 1,000 cc. of polymerization medium for each 100 grams of polymer is employed.

The polymerization, or more specifically, the interpolymerization may be carried out in a variety of ways. Basically, the reaction is achieved by combining any polymerization medium, the monomers and catalyst, and carrying out the reaction thereby initiated to the point at which the desired conversion of monomer to polymer has been obtained. The polymerization can be carried on in either a batch or continuous fashion as preferred.

When ethylene and propylene are polymerized with a suitable polyolefin in a batch system, the production of a product having improved properties can readily be obtained. The order of addition with respect to the components of the polymerization reaction mixture is not particularly important; however, it is preferable that all the monomers which it is proposed to copolymerize be present before the complete catalyst system is added.

The relative amounts of monomers required to be charged to the reaction mixture in order to obtain the polymer compositions desired depend upon the speed with which the different monomers react, and can readily be determined for a particular system. In the case of reaction systems making use of polyolefins having a relatively low order of reactivity, such as for example 1,5-cyclooctadiene, 2-methyl-4-vinyl-1-cyclohexene; and 1-methyl-4-vinyl-1-cyclohexene, and in which the olefin is primarily propylene, conveniently, approximately 5 gram moles of the diolefin is employed for each 100 grams of propylene monomer present in order to obtain about 2.5 mole percent of diolefin in the product. Where the ethylene to propylene ratio of the product is to be about equi-mole, a similar quantity of diolefin is employed. In those cases in which the interpolymer is to consist mostly of ethylene, however, the use of about 50 gram moles of diolefin per 100 grams of monomer is preferred in order to obtain a desired 2.5 mole percent of diolefin in the terpolymer. In the case of relatively fast reacting diolefins such as for example 1,2-dimethyl-4-vinyl-1-cyclohexene; 4-butenyl-1-cyclohexene; 1-allyl-1-cyclohexene; and 5-(3'-cyclohexenyl)-2-norbornene, inclusion of approximately one-half to one-fifth of the quantity of diolefin indicated above will produce a similar terpolymer.

As in the case of the polyolefins, the relative amount of olefins required to achieve a particular composition of olefin units in the interpolymer will depend upon the reactivity of each of the olefins. In producing the ethylene-propylene containing interpolymers, the ethylene reacts much more rapidly than the propylene, and it is necessary, for example, in order to obtain a polymer containing ethylene and propylene in about equimole amounts, to maintain the reaction mixture in a condition such that at all times, the respective olefin monomers are present in a ratio of approximately 80 moles of propylene for each 20 of ethylene.

The polymerization reaction, which is conducted in an inert atmosphere such as nitrogen, argon, hydrocarbon vapors or the like, may be carried out at any of various pressures such as atmospheric, autogeneous or higher. It may also be carried out under subatmospheric conditions, the only requirement being that the conditions of pressure and temperature are such that the system maintains its essentially liquid character. In the case of the ethylene-propylene containing interpolymers, although other pressures may be used, a working pressure of about 10 to 25 p.s.i.g. has been found to be a convenient point at which to conduct the reaction.

As with the pressure variable, the temperature at which the polymerization is conducted may be varied through a wide range. Normally, the polymerization is controlled at a temperature of from about room temperature, i.e., 22° C., to about 50° C. If preferred, however, the reaction can be conducted from about 0° C., or lower, to about 100° C.

About 0.5 to 2 hours is ordinarily necessary to obtain a satisfactory polymerization; however, under suitable conditions, the reaction may be carried out in considerably less time.

After the polymerization has proceeded to the desired point, the reaction may be arrested by deactivating the catalyst in the reaction mixture. Deactivation can be accomplished by introducing into the mixture any of various substances which contain relatively active hydrogen ions such as, for example, alcohols. It is preferable, however, to use materials which have a similar effect insofar as deactivation is concerned, but which contain relatively inactive hydrogen ions. Such materials include, for instance, any of various substances such as acetone, acetic anhydride, trialkyl amines and the like. Although the addition of an amount of catalyst deactivator such that approximately 1 mole of the latter agent is present for each mole of organometallic compound employed, in actual practice it is preferable to add the deactivating agent in amounts constituting a level of about 5 or more moles of deactivator for each mole of the organometallic compound used.

Following deactivation of the reaction mixture, the polymer present may be separated from accompanying substances by precipitating it from solution, conveniently by the addition to the system of a substance which, while substantially miscible with the reaction mixture, has little or no solvating capability with respect to the polymer. Alternatively, separation may be achieved by driving off the volatile constituents and leaving the polymeric product as a residuum. Following production of the polymer in a separable form, either through the addition of the reaction mixture to a substance having only limited solubility for the polymer, or by other means, the polymer may be treated by washing or otherwise to remove traces of the inactivated catalyst and then dried. Polymers of the type with which the invention is concerned are stable substances which are readily dried in a variety of equipment such as hot air driers, extruder driers and various other similar devices.

It is frequently desirable to incorporate antioxidants or other compounding materials with the polymeric product. This may readily be accomplished by introducing such materials into the reaction mixture prior to separation of the polymer. Antioxidants of the type commonly used in natural or styrene butadiene type rubbers are well-suited to the protection of the polymer, and the addition of such materials in relatively minor amounts produces adequate stability.

In curing the interpolymers of the invention, one may employ, if desired, peroxide cures of the type commonly used in conjunction with ethylene-propylene polymers. In addition, and preferably, sulfur curing techniques may be used.

In bringing about a sulfur cure, sulfur vulcanization agents such as sulfur or sulfur containing compounds are normally combined with various auxiliary substances including accelerators, accelerator activators, softeners, fillers, reinforcing agents and the like, and curing is carried out by a heating process in the manner well-known in the art. Various procedures and modifications of sulfur curing are described in The Vanderbilt Rubber Handbook, S. S. Rogers, published by R. T. Vanderbilt Co., N.Y., N.Y.; Synthetic Rubber, G. S. Whitby, published by John Wiley & Sons, N.Y., N.Y., and others.

The following examples, while not intended to be limiting in nature, are illustrative of the invention.

EXAMPLE I

In a typical experiment, a standard polymerization bottle is dried in an air oven, cooled and charged under dry nitrogen with 200 milliliters of tetrachloroethylene. Approximately 5 milliliters of a polyolefin, in this case 1,2-dimethyl-4-vinyl-1-cyclohexene — 33 gram millimoles — is charged to the bottle, also under nitrogen and the latter is capped with a rubber gasket puncture sealing cap arrangement of a type which permits penetration by a hypodermic needle and addition of ingredients to the bottle. Following capping of the bottle, a needle is inserted through the permeable cap, and propylene in the form of a gas is added to the bottle until the pressure in the latter equals 9 p.s.i.g. The catalyst — a solution of ethylaluminum sesquihalide, i.e., an equi-mole mixture of diethylaluminum monochloride and monoethylaluminum dichloride, is next added to the bottle as 10 milliliters of solution (made up of 5 mls of sesquihalide dissolved in 50 milliliters of benzene) containing 8.1 gram millimoles of the sesquihalide, and the polymerization bottle is placed on a wrist-action type shaker. Agitation of the bottle having been commenced, a fifty-fifty mole mixture of ethylene and propylene is introduced through a manifold device connected to a hypodermic needle extending through the rubber cap, and the contents of the bottle are controlled by the arrangement at 10 p.s.i.g. The polymerization reaction is then initiated by adding vanadium oxytrichloride, as 10 milliliters of solution (1.9 mls of vanadium compound in 50 milliliters of benzene) containing 4.2 gram millimoles, also through the permeable cap.

The reaction begun is continued for a period of approximately 1½ hours before being shortstopped, that is, the reaction is terminated by deactivation of the catalyst accomplished by adding 5 milliliters of methanol to the contents of the bottle. The cap is then removed, and the contents of the bottle are poured into a quantity of methanol containing ditertiarybutyl-p-cresol antioxidant to precipitate the elastomer. Following drying over night, 16 hours, in a vacuum oven maintained at 50° C, the process is found to have resulted in the formation of approximately 8.0 grams of elastomeric terpolymer.

Following its production, about 5 grams of the terpolymer is mixed on a 4-inch, 2-roll mill with approximately 0.25 gram of a masterbatch containing 100 parts, by weight, of polyisobutylene, 60 parts of zinc oxide, 20 parts stearic acid, 10 parts mercaptobenzothiazole, 30 parts of tetramethylthiuram monosulfide and 30 parts of sulfur. Two ¼ inch discs cut from the milled interpolymer sulfur masterbatch are placed about the probe of a Shawbury Curometer. The Curometer, a device commonly employed to test curing capabilities, provides an indication of the degree of vulcanization by monitoring the dynamic modulus of the sample during a constant temperature heating period sufficient to produce vulcanization. During the test period, the modulus is constantly tested by motion of the probe back and forth through the sample. Heat is simultaneously supplied to the specimen, and the length of probe travel is continuously measured. The dynamic modulus of samples amenable to sulfur vulcanization changes as curing progresses, and such fact is indicated by two lines drawn on a moving chart which respond to variations in travel of the probe. In those cases in which a cure is obtained, the lines gradually converge; whereas in samples incapable of undergoing a sulfur cure, the trace lines remain substantially parallel. In the here-detailed test, a good convergence of lines is obtained within about 9 minutes, indicating that the terpolymer is capable of satisfactory sulfur vulcanization.

EXAMPLE II

In another experiment, an eight ounce bottle is dried in an oven, cooled, charged with 200 milliliters of tetrachloroethylene and subsequently with 5 milliliters, 37 gram millimoles, of 1-methyl-4-vinyl-1-cyclohexene. The bottle is capped with a permeable, self-sealing cap, and polypropylene is fed into the bottle until the pressure of the latter reaches about 9 p.s.i.g. Following addition of the propylene constituent, the ethylaluminum sesquichloride is added in the form of 10 milliliters of solution containing 8.1 gram millimoles of reagent mixed in benzene, and the polymerization bottle is placed on a wrist-action type shaker. As the contents of the bottle are agitated, an ethylene-propylene mixture, 50/50 mole, is fed into the reaction, and the manifold is adjusted to continuously provide a 10 p.s.i.g. pressure on the mixture. The polymerization is initiated by passing the final component of the catalyst, vanadium oxytrichloride, as 10 milliliters of solution containing 4.2 gram millimoles of reagent in combination with benzene, into the bottle through a hypodermic needle in the usual fashion. Polymerization begins immediately following addition of the vanadium compound and is continued for approximately 1½ hours before the reaction is shortstopped by the addition of methanol. The polymerization bottle is then uncapped and its contents emptied into antioxidant containing methanol to precipitate the polymer. The product is dried over night in a vacuum oven, with the result that about 9.1 grams of the terpolymer are obtained.

A representative sample, amounting to 5 grams of the product, is compounded in the manner of Example I and its vulcanization characteristics checked on a Shawbury Curometer. Convergence of the traced lines produced by the Curometer indicates a suitable sulfur vulcanization at a curing temperature of 320° F. following a residence time of about 7 minutes.

EXAMPLE III

In a further example, a polymerization bottle is heated for drying purposes, and cooled in the manner of the preceding examples. Following its preparation, 200 milliliters of hexane and 5 milliliters — 26 gram millimoles — of the diene, i.e., 5-(3'-cyclohexenyl)-2-norbornene are added in the order shown, under a nitrogen atmosphere. Following charging, the bottle is capped with a puncturable cap, and sufficient propylene is introduced to increase the pressure within the bottle to 20 p.s.i.g. At this point, the ethylaluminum sesquihalide component of the catalyst is added in the form of 10 milliliters of solution (containing 5 mls of sesquichloride in 50 millliliters of benzene) - an amount equivalent to 8.1 gram millimoles of the aluminum compound. After addition of the aluminum component, a 50-50 mole mixture of ethylene-propylene is added to the reaction mixture, by now somewhat yellow in color, by means of a manifold arrangement connected to a hypodermic needle inserted through the permeable cap. Addition of the ethylene-propylene mixture is made in an amount sufficient to cause the pressure to rise to about 25 p.s.i.g. where it is controlled by the manifold device. Approximately 3.0 gram millimoles of the vanadium oxytrichloride are then injected into the bottle in the form of 10 milliliters of reagent solution, 1.5 mls. of the vanadium compound combined with 50 milliliters of benzene.

The reaction commences automatically following addition of the vanadium compound — which initially turns the reaction mixture a purple color — and is continued for a period of 2 hours before being terminated by the insertion of 5 milliliters of methanol into the bottle. After the reaction has been shortstopped, the bottle is uncapped, and the contents are added to a solution of methanol rubber antioxidant to produce precipitation of the product. The interpolymer is dried for about 16 hours at 50° C. in a conventional vacuum oven to produce 10 grams of interpolymer.

Test discs are cut from product milled with the sulfur containing masterbatch of Example I, and a test is conducted on the Shawbury Curometer in the manner previously indicated. A pronounced convergence of the trace lines following approximately 9 minutes indicates that a sulfur cure can be expected with this type of terpolymer. The degree of convergence tends to indicate that the vulcanized products obtained from such terpolymers would permit manufacture of articles possessing good physical properties.

EXAMPLE IV

In this experiment, a closed 5-gallon vessel, provided with mixing apparatus, is thoroughly cleaned, dried, and charged in a nitrogen atmosphere with 15½ litters of hexane. A polyolefin, in this example, 1,5 cyclooctadiene, is next added, approximately 250 milliliters, 2.01 gram moles of the diene being introduced. Agitation of the vessel having been commenced, a mixture of ethylene and propylene monomer - containing an 80-20 mole ratio of propylene to ethylene - is pressured into the vessel until a reactor pressure of 15 p.s.i.g. has been reached. The catalyst components, including both ethylaluminum sesquichloride and vanadium oxytrichloride, are then added, 155 gram millimoles of the sesquichloride and 38.7 gram millimoles of vanadium oxytrichloride being added in all.

Upon addition of the catalyst system, the polymerization commences, and an equi-mole mixture of ethylene and propylene is thereupon continuously fed to the reaction mixture. After approximately 1 hour of reaction time, the reaction is terminated by the addition of methanol, and the product is worked up, i.e., precipitated, and dried in the usual manner to yield 418 grams of rubbery terpolymer.

A standard rubber compound is prepared from the elastomeric terpolymer by combining 100 parts, by weight, of the terpolymer with 50 parts of ISAF black; 10 parts of Circosol 2XH, a napthenic oil available from the Sun Oil Company of Philadelphia, Pa.; 5 parts zinc oxide; 1 part of stearic acid; 1 part of tetramethylthiuram monosulfide; ½ part mercaptobenzothiazole, and 1 part of sulfur. The compounded rubber is cured at 320° F. for about 50 minutes to yield a 300% modulus of 350 p.s.i., a tensile of 2020 p.s.i.; and a percent elongation of 910. Following 30 minutes of cure at 320° F., the 300% modulus is found to be 400 p.s.i.; the tensile 2090 p.s.i.; and the percent elongation 880; results clearly indicating that a satisfactory sulfur vulcanization has taken place.

EXAMPLE V

In another experiment, each of a group of 14 polymerization bottles, cleaned and dried in the manner of the previous experiments, is charged in a nitrogen atmosphere with 200 milliliters of hexane together with approximately 11 gram millimoles of 4-butenyl-1-cyclohexene, and the bottles are closed with puncture-sealing caps. The catalyst system employed is one consisting of ethylaluminum sesquichloride and vanadium oxytrichloride, the components being present in each of the bottles at the level of 2½ gram millimoles of the sesqui compound and one gram millimole of vanadium oxytrichloride. Following addition of the catalyst, the monomer content is adjusted to provide a mole concentration of 80-20, propylene to ethylene, and the concentration of the system is maintained at that point during the reaction, which is allowed to continue for a period of approximately 1½ hours.

Following termination and work-up in methanol, the yields amount to from about 10 to 12.1 grams of polymer per bottle; the dilute solution viscosity of the polymer varies from a low in one bottle of 1.95, to a value of 2.57 in the highest bottle, the average being about 2.3, and the mole percent unsaturation of the product is found to range from 2.34 to 2.8 in the different bottles, mole percent unsaturation being calculated from the grams of iodine which react with 100 grams of polymer.

Representative portions of the product which has a Mooney viscosity, ML-4' 212° F., of about 82 are compounded in a recipe which includes 100 parts, by weight, of polymeric product; 50 parts of ISAF black; 10 parts of Circosol 2XH oil; 5 parts zinc oxide; 1 part of stearic acid; ½ part of mercaptobenzothiazole; 1 part of tetramethylthiuram monosulfide; and 1 part of sulfur, a mixture having a Mooney viscosity of 109.

Physical tests carried out on the vulcanizate give results as follows:

| Vulcanization Time 320° F — minutes | 300% Modulus p.s.i. | Ultimate Tensile p.s.i. | Elongation % |
|---|---|---|---|
| 44 | 560 | 2520 | 800 |
| 88 | 690 | 2500 | 730 |

Again, the results indicate formation of an ethylene-propylene containing terpolymer capable of being cured with standard sulfur techniques, an article of commerce valuable for the reasons previously given.

EXAMPLE VI

In this experiment a polymerization bottle, cleaned and dried in the manner of Example I, is charged with 200 milliliters of hexane, and a mixture of dienes adjusted to contain 3.4%, by weight, of 4-butenyl-1-cyclohexene, 77% of 4-hexenyl-1-cyclohexene, and 13½% of 4-octenyl-1-cyclohexene. Following the additions, made in a nitrogen atmosphere, the polymerization bottle is pressured to 9 p.s.i.g. with propylene, and the catalyst is added. In this case the catalyst system consists of 5 milliliters of a solution made up to contain 1 milliliter of vanadium oxytrichloride in 50 milliliters of hexane and 4.07 milliliters of a solution containing 5 milliliters of ethylaluminum sesquihalide — also in 50 milliliters of hexane — , a system containing 1.03 gram millimoles of the vanadium compound and 3.3 gram millimoles of the ethylaluminum sesquihalide.

Upon addition of the catalyst, the polymerization reaction begins and the same is carried on for a period approaching 1½ hours. During the reaction, the pressure of the system is maintained at 10 p.s.i.g. by continuous introduction of a 50-50 mole mixture of ethylene and propylene. At the end of the polymerization, the reaction is terminated with methanol in the usual fashion, and the product worked up and dried in a vacuum oven to yield about 12.2 grams of elastomeric product.

A sample of the product, compounded in the manner of Example I, is tested on the Curometer and displays a sufficient convergence of the trace lines to indicate that a sulfur cure can be expected in approximately 8 minutes under the conditions of the test.

EXAMPLE VII

In still another experiment, a polymerization bottle of a standard type, prepared in the manner of the previous examples, is charged with 200 milliliters of hexane followed by 5 milliliters, 37 gram millimoles, of 2-methyl-4-vinyl-1-cyclohexene, and the bottle is closed with a puncturable, self-sealing cap. A quantity of propylene sufficient to increase the pressure within the polymerization bottle to 9 p.s.i.g. is introduced into the bottle, and 10 milliliters of ethylaluminum sesquichloride solution containing 8.1 gram millimoles of reagent in benzene is injected into the reaction mixture. As in the previous examples, a manifold is employed to pressure a 50-50 mole mixture of ethylene-propylene monomer into the polymerization bottle. The reaction pressure is raised to 10 p.s.i.g. and continued at that point throughout the reaction. While the bottle is being agitated on a wrist-type shaker, the vanadium constituent of the reaction is injected into the mixture in the form of 10 milliliters of solution containing 4.2 gram millimoles of vanadium oxytrichloride in benzene, to initiate the reaction.

The polymerization thus begun is continued for approximately 1 hour and 5 minutes after which time the catalyst is deactivated by the addition of 5 milliliters of methanol through a hypodermic needle. The bottle is then uncapped and its contents emptied into an excess of methanol to induce precipitation of the elastomeric product. The elastomer obtained is separated from the reaction mixture and dried for about 16 hours in a vacuum oven at 50° C. to produce 7.4 grams of product.

A 5 gram sample of the terpolymer is milled with a sulfur containing masterbatch, as previously described, and discs cut from the milled material are employed in conjunction with the Shawbury Curometer to obtain a vulcanization that in this case requires a period approaching 8 minutes to obtain. The amplitude of convergence indicates that a satisfactory cure can be expected in vulcanizations of this terpolymer.

EXAMPLE VIII

In another example, 200 milliliters of hexane is charged, in the presence of nitrogen, to a polymerization bottle dried and cooled in the manner of Example I. Prior to capping the bottle with a self-sealing, permeable cap, 5 milliliters, 42 gram millimoles, of 1,5-cyclooctadiene are also added. After the bottle has been capped, a hypodermic needle is used to inject propylene monomer in the form of a gas until pressure in the polymerization bottle has been increased to 9 p.s.i.g. At this point, ethylaluminum sesquichloride is introduced, also by means of a needle — 10 milliliters of solution (5 ml. of sesquihalide in 50 milliliters of benzene), 8.1 gram millimoles, being added in this fashion. After addition of the sesquihalide material, the bottle is placed on a wrist-action shaker, and agitation is commenced. During agitation, an equi-mole gaseous mixture of ethylene and propylene is added to the bottle through a hypodermic needle, and the vanadium component of the catalyst is inserted in the form of vanadium oxytrichloride - 10 milliliters of solution (1.9 mls of the vanadium compound in 50 milliliters of benzene), 4.2 millimoles of the vanadium compound — being added in all.

Upon addition of the vanadium compound, the polymerization commences and is permitted to continue for a period of about 2 hours before being discontinued by the addition of 5 milliliters of methanol. Following deactivation of the catalyst, the bottle is opened, and the reaction mixture is combined with antioxidant containing methanol to cause precipitation of the polymer. The precipitated polymer is subsequently separated and dried in a vacuum oven over night at approximately 50° C.; about 9.0 grams of polymer are thus obtained.

A representative sample, amounting to 5 grams of terpolymer, is combined in a milling operation with the sulfur masterbatch set forth in Example I, and suitable discs are cut for testing on the Shawbury Curometer. Tests conducted indicate that curing takes place within approximately 6 minutes and is of a sufficient quality to justify commercialization of the terpolymer. The relatively short time in which a cure is obtained is of particular significance.

EXAMPLE IX

In this experiment, an interpolymer is prepared, utilizing as the sulfur vulcanization producing polyolefin, monomeric 1-allyl-1-cyclohexene. In the experiment, 200 milliliters of hexane and 2 milliliters — 15 gram millimoles — of the 1-allyl-1-cyclohexene are added in the order shown, under a nitrogen atmosphere, to an 8 oz. polymerization bottle prepared in the manner of Example I. Following additions, the bottle is capped with a rubber gasket-puncturable seal combination of the type previously described, and an amount of propylene sufficient to increase the pressure of the bottle to 5 p.s.i.g. is introduced by means of a hypodermic needle. After the propylene addition, 5 milliliters of ethylaluminum sesquichloride dissolved in benzene - equivalent to 4.05 gram millimoles of the aluminum compound - are injected into the reaction mixture through the permeable seal. A 50-50 mole mixture of ethylene-propylene is then fed to the bottle through a manifold arrangement adjusted so that the pressure of the polymerization bottle is maintained throughout the reaction at approximately 5 p.s.i.g. Agitation of the polymerization bottle during addition of the ethylene-propylene mixture and while the reaction is carried out, is accomplished by means of a wrist-action type shaker upon which the bottle is mounted. Following introduction of the ethylene-propylene mixture, vanadium oxytrichloride is added to the reaction mixture in the form of 5 milliliters of the vanadium compound dissolved in benzene — a mixture containing approximately 1.53 millimoles of vanadium.

Upon addition of the vanadium, the polymerization reaction commences and is continued for about 2 hours. The reaction is ultimately terminated by addition of a shortstop agent, in this case 5 milliliters of methanol, added to the reaction mixture through a hypodermic needle. Following deactivation, the bottle is opened and its contents dispersed into anti-oxidant containing methanol; whereupon the product is precipitated from solution. The elastomereic terpolymer is subsequently separated from the reaction mixture and dried over night in a vacuum oven maintained at about 50° C.

A representative portion of the product is milled with the sulfur containing masterbatch outlined in the first example, and the Shawbury Curometer data obtained from tests of the milled material shows that a satisfactory vulcanization of the material in 12 minutes can readily be obtained.

EXAMPLE X

In a further experiment, designed to test still another polyolefin for inclusion in ethylene-propylene containing interpolymers, a polymerization bottle is charged with 200 milliliters of hexane and one milliliter, 7 gram millimoles, of 4-butenyl-1-cyclohexene. The additions are made to a bottle prepared in the manner of Example 1, and following charging, the bottle is capped with a puncturable self-sealing cap. Propylene is then metered in through a hypodermic needle until the interior pressure of the polymerization bottle reaches 9 p.s.i.g. Approximately 5 milliliters of ethylaluminum sesquichloride solution (5 mls of sesquihalide in 50 milliliters of benzene), equivalent to 4.05 gram millimoles of the aluminum compound, are also added. Following addition of the aluminum compound, the polymerization bottle is mounted on a wrist-action type shaker, and during agitation, a mixture of ethylene and propylene, 50-50 mole composition, is introduced into the reaction mixture. The pressure of the reaction is maintained at 5 p.s.i.g. through a manifold feed arrangement. To commence the reaction, 5 milliliters of vanadium oxytrichloride solution (1.5 mls of vanadium compound in combination with 50 milliliters of benzene), providing a vanadium content of approximately 1.53 gram millimoles, is injected into the mixture.

The ensuing polymerization is permitted to continue for a period of 2 hours before the reaction is terminated by the addition of 5 milliliters of methanol. The contents of the bottle are subsequently discharged into additional methanol, containing a rubber antioxidant, to accomplish the necessary precipitation of product. The resulting interpolymer is separated from the methanol solution and dried over night in a vacuum oven controlled at about 50° C. to produce an elastomeric product weighing about 6.5 grams.

A 5 gram aliquot is compounded by incorporation with the masterbatch shown in Example I, and two ¼ inch discs are cut therefrom for testing on the Shawbury Curometer. The lines produced on the Curometer show a satisfactory convergence following approximately 6 minutes of curing time, indicating suitability of the elastomer for sulfur vulcanization type cures.

What is claimed is:

1. Vulcanizable, elastomeric terpolymers of ethylene, propylene and a mixture of terminally unsaturated cyclohexenyl compounds of the general formula

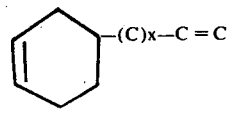

in which $x$ is an integer from 2 to 10, inclusive, said ethylene and propylene monomeric units being present in approximately equi-mole proportions, and said terminally unsaturated cyclohexenyl compounds constituting at least about 0.3 mole percent of the terpolymer based on the total monomeric units present.

2. Vulcanizable elastomeric terpolymers of ethylene, propylene, and 4-butenyl-1-cyclohexene, said ethylene and propylene monomeric units being present in approximately equi-mole proportions, and said 4-butenyl-1-cyclohexene constituting at least about 0.3 mole percent of the terpolymer based on the total monomeric units present.

* * * * *